(No Model.) 2 Sheets—Sheet 1.
J. F. BUSCHMANN.
COMBINED COFFEE MILL AND CANISTER.
No. 539,345. Patented May 14, 1895.
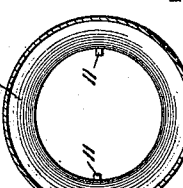
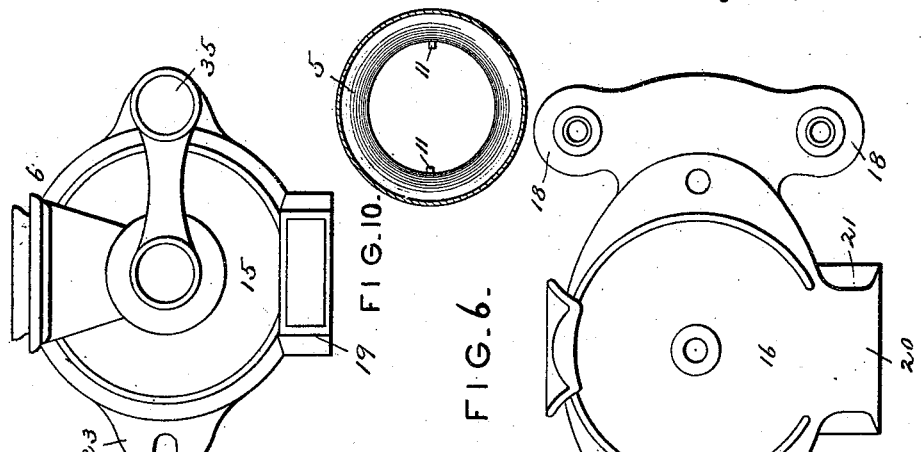
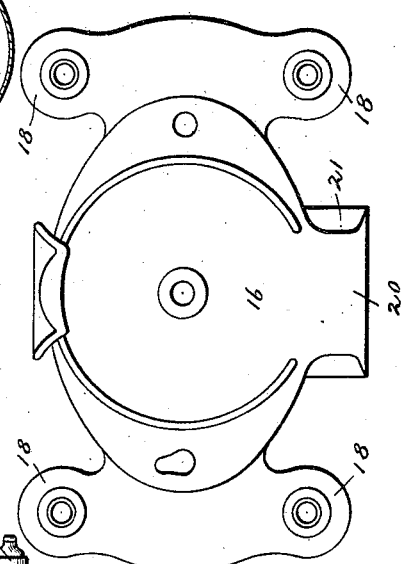
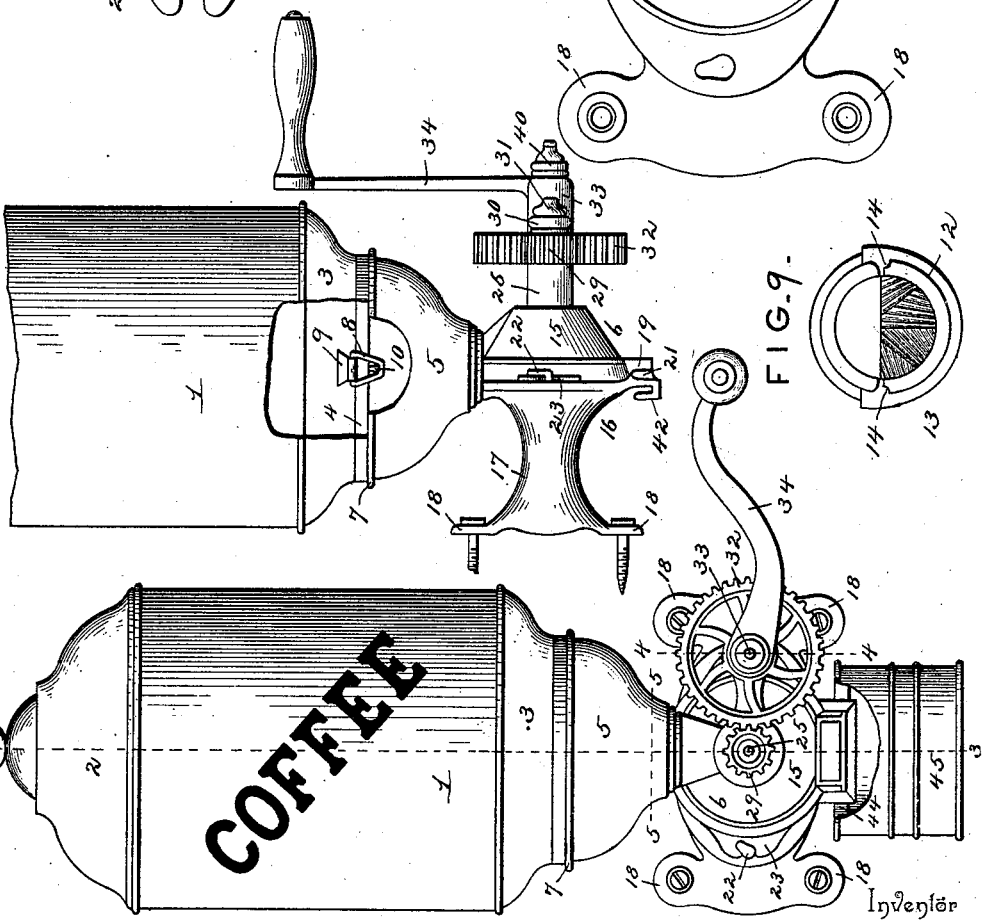
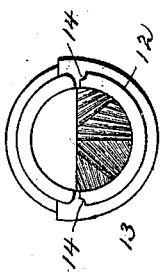
Witnesses
Harry L. Amer.
H. F. Riley
Inventor
John F. Buschmann.
By his Attorneys.
C. A. Snow & Co.
THE NORRIS PETERS CO., PHOTO-LITHO., WASHINGTON, D. C.

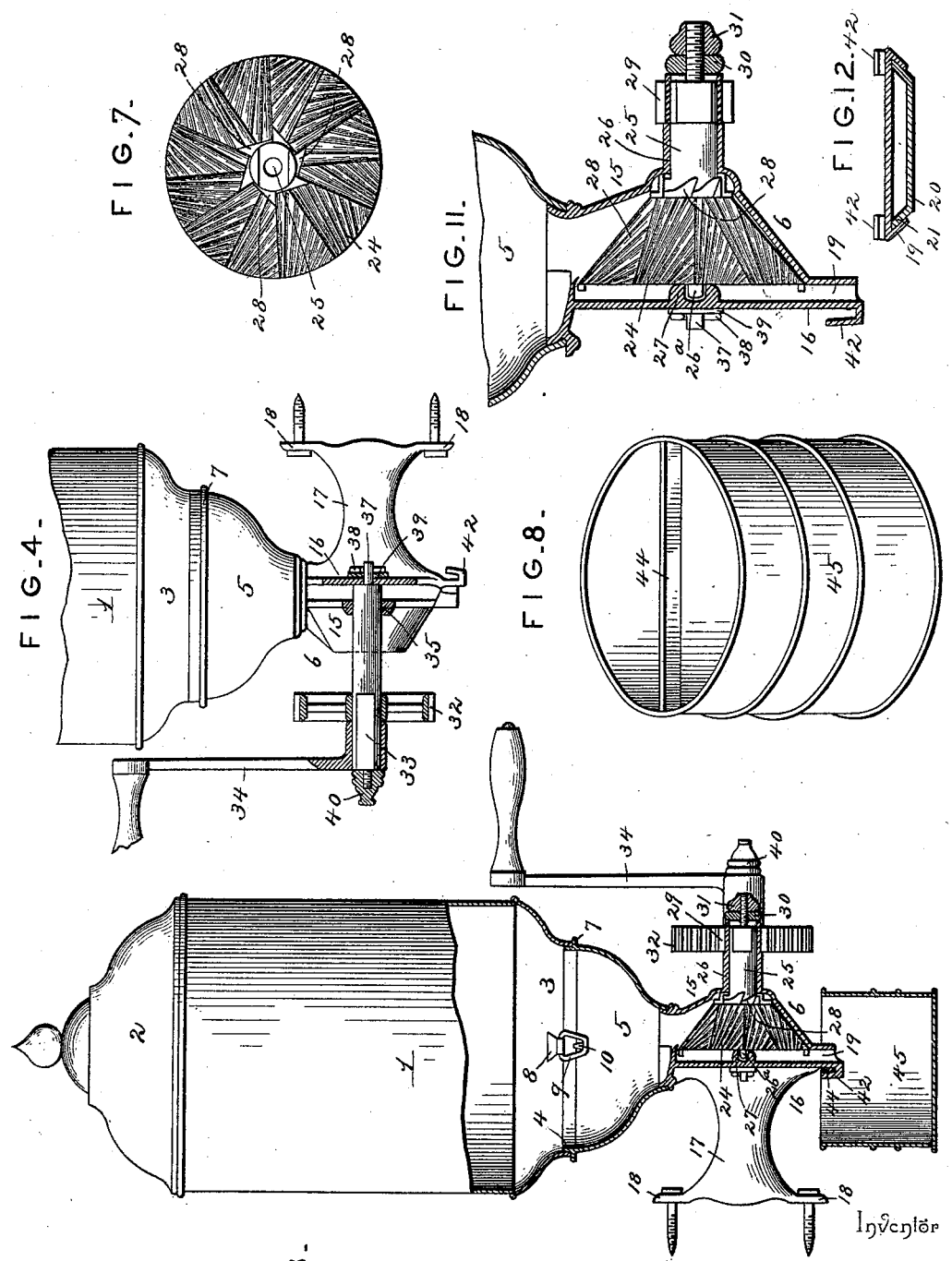

UNITED STATES PATENT OFFICE.

JOHN F. BUSCHMANN, OF HATTIESBURG, MISSISSIPPI.

COMBINED COFFEE MILL AND CANISTER.

SPECIFICATION forming part of Letters Patent No. 539,345, dated May 14, 1895.

Application filed June 20, 1894. Serial No. 515,160. (No model.)

*To all whom it may concern:*

Be it known that I, JOHN F. BUSCHMANN, a citizen of the United States, residing at Hattiesburg, in the county of Perry and State of Mississippi, have invented a new and useful Combined Coffee Mill and Canister, of which the following is a specification.

The invention relates to improvements in combined coffee mills and canisters.

The object of the present invention is to provide a simple and inexpensive combined coffee mill and canister, adapted to hold a quantity of coffee, and capable of enabling the same to be ground from time to time as desired, to preserve the strength and aroma of the coffee, to exclude dust and dirt from the same, and to enable coffee to be handled without waste or inconvenience.

The invention consists in the construction and novel combination and arrangement of parts hereinafter fully described, illustrated in the accompanying drawings, and pointed out in the claims hereto appended.

In the drawings, Figure 1 is a front elevation of a combined coffee mill and canister constructed in accordance with this invention. Fig. 2 is a side elevation of the same, partly broken away, to illustrate the manner of securing the canister or receptacle to the bowl of the coffee-mill. Fig. 3 is a vertical sectional view of the coffee-mill on line 3 3 of Fig. 1. Fig. 4 is a similar view on line 4 4 of Fig. 1. Figs. 5 and 6 are detail views of the front and rear plates or sections of the coffee-mill casing. Fig. 7 is a detail view of the grinding-cone. Fig. 8 is a detail perspective view of the measuring-cup. Fig. 9 is a detail view of the neck of the coffee-mill. Fig. 10 is a similar view of the lower portion of the bowl. Fig. 11 is an enlarged sectional view of the coffee-mill. Fig. 12 is a detail sectional view illustrating the manner of interlocking the sections of the casing at the bottom thereof.

Like numerals of reference indicate corresponding parts in all the figures of the drawings.

1 designates a coffee receptacle or canister, preferably of general cylindrical shape, and provided with a removable cover 2, and having a tapering lower end 3 fitting over and receiving within it an upper edge or flange 4 of a bowl 5 of a coffee mill 6. The bowl 5 of the coffee mill is provided with an exterior annular rib 7, arranged at the base of the flange 4 and supporting the lower edge of the canister or receptacle 1; and the canister is detachably secured to the bowl at opposite sides by a swinging loop 8, hinged at 9, to the inner face of the canister, and arranged to engage a lug 10 projecting inward from the inner face of the bowl. The swinging loop 8 is of substantial triangular-shape, its lower apex being slightly broadened to fit the lower shoulder of the lug.

The bowl 5 of the coffee mill is detachably secured to the casing, and is provided at diametrically opposite points with inward projecting lugs 11, engaging an annular groove 12 of a circular neck 13, of the coffee mill casing, opposite notches or recesses 14 being provided to permit the lugs 11 to be introduced into and engaged with the annular groove of the neck. After the lugs have been introduced into the groove, the bowl is given a slight turn to carry them away from the notches or recesses. The lower end of the bowl receives the neck of the coffee mill casing, which is composed of front and rear sections 15 and 16, and it serves to connect the sections, and hold them together.

The rear section 16 consists of a central substantially circular body portion or plate, and rearward extending bracket arms 17, terminating at their rear ends in upper and lower perforated ears 18 for the reception of screws or other fastening devices, whereby the combined coffee mill and canister is secured to a suitable support in a kitchen or elsewhere. The front section 15 is substantially conical, and both sections are provided at the top with the substantially semi-circular portions which form the neck 13. At the bottom of the casing the front section is provided with a discharge chute 19, which is arranged in a way 20, formed by beveled lugs 21 of the rear section; and the two sections are further secured by a pivoted button 22 mounted on the rear section, and engaging a recessed extension 23 of the front section.

Within the conical portion of the casing is arranged a grinding cone 24 mounted on a horizontal shaft 25, which is journaled in a tubular extension 26 of the front section of the coffee mill casing. The inner end of the shaft 25 is reduced to form a journal 26ᵃ, which is arranged in a socket 27 formed in a central enlargement or boss of the rear section of the casing. The grinding cone is provided with sharp edges formed by grooves which are cut to form the cutting edges to the left. The inner face of the conical portion of the front section of the casing is provided with corresponding cutting edges, and the shaft, at the smaller end of the cone, is provided with substantially triangular teeth 28, and the casing is slightly bulged to form an annular recess at this point.

The shaft 25 extends outward beyond the tubular portion of the casing. Its opposite sides are flattened to receive a pinion 29, and its outer extremity is reduced and threaded for the reception of an adjusting nut 30, and a jam nut 31, whereby the grinding action of the coffee mill may be readily regulated.

The pinion 29 meshes with a cog wheel 32 fixed to a shaft 33, which carries a handle 34, and which is journaled in a bearing opening 35 of the front section of the casing. The inner end of the shaft is reduced at 37 passed through a perforation of the rear section of the casing, and secured to the same by a split key 38 and a washer 39; and the outer portion of the shaft is flattened at opposite sides to receive the cog wheel and the handle, the openings of both of which conforming to the configuration of the shaft, whereby the handle and the cog wheel are fixed to the same. The outer terminal of the shaft 33 is reduced and threaded to receive a nut 40, which secures the handle and the cog wheel on the flattened portion 41.

The rear section of the casing is provided at opposite sides of the discharge chute with hooks 42 to receive a cross-piece 44 of a measuring cup or vessel 45, whereby the latter is suspended from the coffee mill. The cross-piece 44 is arranged edgewise in the vessel 45. It serves as a convenient handle to enable the vessel to be carried, and it is adapted to be readily engaged with the hooks. The vessel is provided at intervals with rings or ribs 46, to enable the quantity of coffee ground to be readily ascertained at a glance.

It will be seen that the combined coffee mill and canister is simple and comparatively inexpensive in construction, that it greatly facilitates the handling of coffee, that it preserves the strength and aroma of the same, and prevents any waste. It will also be apparent that dust, dirt, and fumes arising from cooking, and the like, are excluded from the coffee, and that the latter may be readily ground without inconvenience from time to time as desired.

Changes in the form, proportion, and the minor details of construction may be resorted to without departing from the principle, or sacrificing any of the advantages of this invention.

What I claim is—

1. The combination of a canister, a coffee mill having a bowl fitting within the canister and provided below its upper edge with an exterior supporting shoulder and having, at opposite sides of its interior, lugs, and the pair of swinging triangular loops hinged to the canister and located within the latter and depending below the lower edges of the same and engaging the lugs, substantially as described.

2. The combination of a coffee mill having a casing composed of two sections and provided at the top with a neck having an annular groove and opposite notches communicating with the groove, a detachable bowl conforming to the configuration of the neck and provided with lugs engaging the groove and being of a size to pass through the notches, and means for connecting the sections of the casing at the bottom thereof substantially as described.

3. The combination of a coffee mill casing having a neck and composed of two sections, the front section being provided at the bottom with a discharge chute and the rear section having opposite flanges forming a way receiving the discharge chute, and a bowl receiving the neck and detachably secured to the same and connecting the sections at the top, substantially as described.

4. The combination of a coffee mill having a casing provided at the top with a neck and composed of front and rear sections, the front section being provided at the bottom with a discharge chute and the rear section having opposite lugs to receive the discharge chute and provided with rearward extending arms terminating in perforated ears, a bowl receiving the neck of the casing and detachably secured to the same, and the pivoted button mounted on the rear section of the casing and engaging the front section thereof, substantially as described.

5. The combination of a coffee mill casing composed of front and rear sections, the rear section being provided with a rearward extending bracket arm designed to be secured to a suitable supporting surface, a bowl interlocked with the sections at the tops thereof, means for connecting the bottoms of the sections, and grinding mechanism mounted on the front section, substantially as described.

6. The combination of a coffee mill casing composed of sections, a detachable bowl secured to the sections at the top thereof and connecting the same, a shaft 25 journaled in the casing, a grinding cone mounted on the same, a shaft 33 journaled in suitable bearings of the casing and provided with a crank handle, and gearing connecting the shafts, substantially as described.

In testimony that I claim the foregoing as my own I have hereto affixed my signature in the presence of two witnesses.

JOHN F. BUSCHMANN.

Witnesses:
M. L. THOMPSON,
W. C. BENNETT.